United States Patent [19]

Lawrence et al.

[11] 4,185,711
[45] Jan. 29, 1980

[54] MOTORIZED CART

[76] Inventors: Richard Lawrence, 39 Manchonis Rd.; Walter Lovell, 348 Mountain Rd., both of Wilbraham, Mass. 01095

[21] Appl. No.: 863,304

[22] Filed: Dec. 22, 1977

Related U.S. Application Data

[62] Division of Ser. No. 665,233, Mar. 9, 1976, Pat. No. 4,081,047.

[51] Int. Cl.² ............................................. B62D 51/04
[52] U.S. Cl. .................................. 180/214; 188/82.9; 180/19 R; 180/282
[58] Field of Search ...................... 180/25, 65 R, 65 F, 180/103 BF, 19 S, 19 H, 19 R, 26 R; 280/DIG. 5; 188/82.9, 82.7, 29, 30, 139; 192/3 H, 8 R

[56] References Cited

U.S. PATENT DOCUMENTS

| 1,778,341 | 10/1930 | Schlegel et al. | 188/82.9 |
| 2,345,203 | 3/1944 | La Via | 180/30 X |
| 3,150,735 | 9/1964 | Kaufman | 280/DIG. 5 |
| 3,380,562 | 4/1968 | Dahlin | 188/82.9 |

*Primary Examiner*—John A. Pekar
*Attorney, Agent, or Firm*—Charles R. Fay

[57] ABSTRACT

A motorized cart comprising a wheeled frame, a shroud, and a dirigible free-ended handle, said handle having a longitudinally movable hand grip at the free end thereof, the hand grip having connected thereto means increasing and decreasing the speed of the cart depending only on the pull of the user on the hand grip. There is an automatic brake rendering the cart immobile upon stopping; and a separate brake preventing the cart from sliding rearwardly downhill.

1 Claim, 7 Drawing Figures

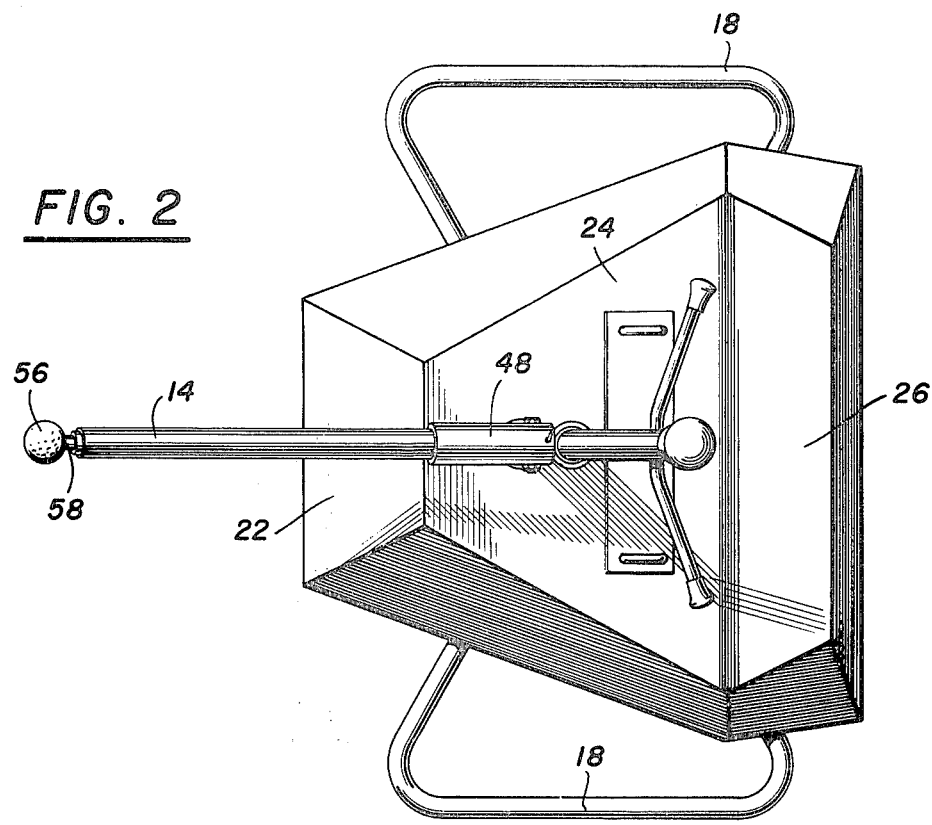
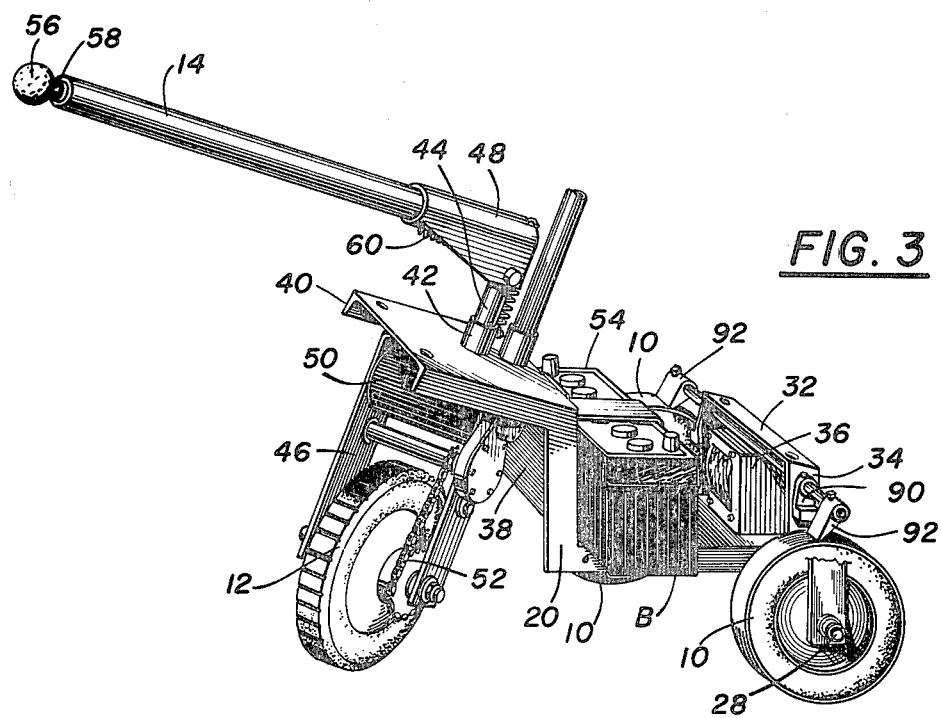

MOTORIZED CART

This is a division of Ser. No. 665,233, filed Mar. 9, 1976, now U.S. Pat. No. 4,081,047.

BACKGROUND OF THE INVENTION

It is well-known that particularly in the game of golf all attention is placed upon the game itself and interruptions of any kind are not desirable inasmuch as the concentration of the player is disrupted thereby.

There have been power operated carts proposed utilizing a handle having acceleration and deceleration means thereon but such prior art devices have required attention on the part of the operator by manual manipulation to increase the speed of the cart or to decrease it and stop it. It is the object of the present invention to provide a power operated cart having means to cause it to proceed at variable speeds dependent only upon the user grasping the hand grip and pulling on it, resulting in immediate response for the cart to move at the exact pace of the user without any attention on the part of the user.

SUMMARY OF THE INVENTION

The power operated cart of the present invention comprises a wheeled frame upon which is mounted a battery and an electric motor covered by a shroud, therebeing a fork assembly for steering a single dirigible front wheel, the motor being mounted on the fork, the fork having a shank extending upwardly through the shroud for the reception of a free-ended handle mounted thereon for steering the wheel in any direction.

The handle includes a rheostat for controlling the electric motor, said rheostat energizing the motor through a pair of transistors by which means the battery current can be fed to the motor. The control for the rheostat is moved in a circular manner by means of a wire wrapped thereon and connected to a hand grip at the free end of the handle so that when the hand grip is grasped by the user who starts to pull it in the direction he wishes the cart to go, the rheostat immediately closes the circuit and causes the motor to be energized. The faster the user walks, the more the wrap turns the rheostat control, and the faster the motor drives the cart, so that the cart goes with the exact speed of the forward motion of the user whether up or down hill, or on a level.

The rheostat may be moved through a range from open condition of the circuit to a fully closed condition thereof whereupon means is provided to short circuit the rheostat and the full power of the battery is fed to the motor.

A shroud is provided with outboard stabilizers to prevent tipping on hillsides. There is provided an automatic brake which brakes the cart at all times when the motor circuit is open. When the motor starts the brake is automatically released, and when the motor stops, the brake is automatically applied. There is a rear shaft which has two wheels on fixed axes, and on the shaft is a pendulum actuated brake so that if the cart is on a hillside and would tend to roll downhill rearwardly, this brake is automatically engaged. The cart cannot go down the hill forwardly unless the hand grip is pulled upon due to the automatic brake described above.

BRIEF DESCRIPTION OF THE DRAWINGS

FIG. 2 is a top plan view thereof;

FIG. 3 is a view illustrating the construction with the shroud removed;

PREFERRED EMBODIMENT OF THE INVENTION

Figure 1:
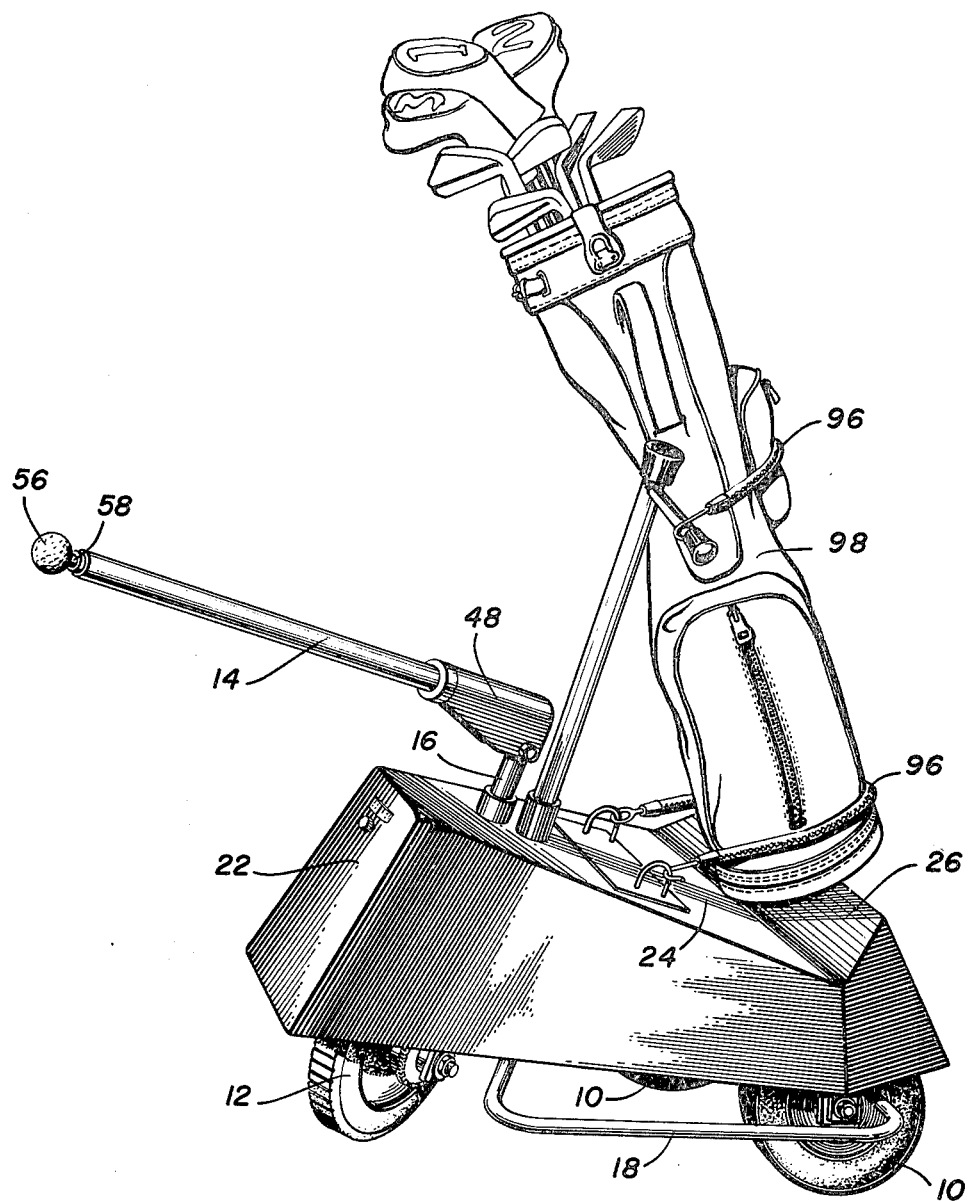
FIG. 1 is a view in side elevation illustrating the invention.

The present cart is disclosed as having three wheels, a pair of spaced wheels 10—10 in the rear which rotate on a fixed axis and a single dirigible wheel 12 at the front. The dirigible wheel 12 is turned in any direction as by handle 14 on a swivel 16. There are side stabilizers 18 and these are connected with respect to a main frame generally indicated at 20.

A shroud 22 generally triangular in shape covers the frame etc., and has a blunted or square front apex with depending side walls and top 24 which slants upwardly towards the front and at the rear more abruptly turns upwardly as at 26.

With the shroud 22 removed there will be seen to be a shaft 28 for the wheels 10—10, the shaft being mounted on the frame 20 which may be of any rigid description but has a rear member 32 including brackets 34—34 for bolting the shroud and supporting the shroud and also for a battery charger 36. The stabilizers 18 may each have an end secured to the ends of shaft 28.

The frame 20 extends forwardly and as shown in an inverted channel iron having at its forward end an upright channel iron 38 terminating in an upwardly inclined member 40 which again supports the shroud which is bolted thereto. A collar 42 receives a shank 44 for a yoke 46 journaling the front dirigible wheel 12. The handle 14 is connected to the shank 44 by any desired or convenient means and has at its inner end a housing 48 containing the electric controls for a motor 50 conveniently mounted on the yoke 46. This motor drives wheel 12 by a chain 52 deriving its power from a battery 54 conveniently mounted on the forwardly extending portion of the main frame 20.

Figure 4:
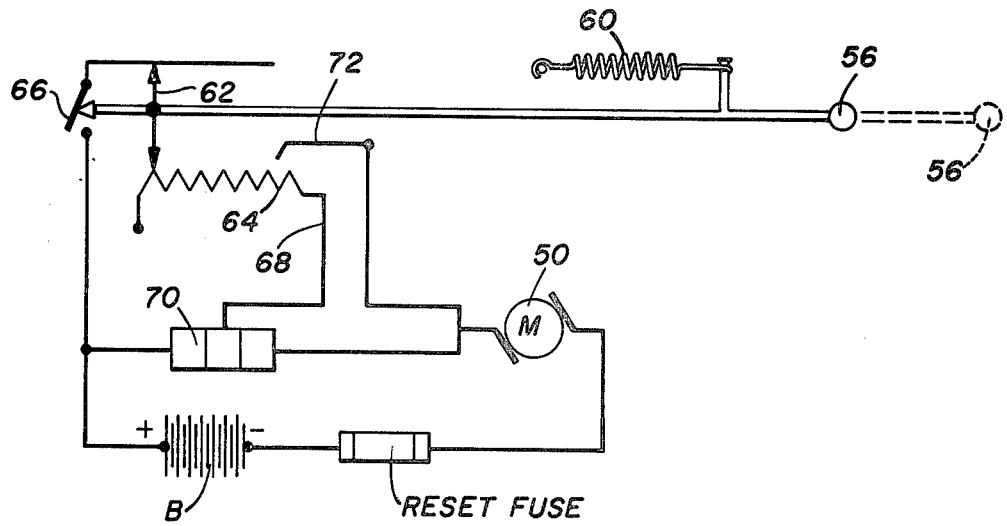
FIG. 4 is a diagram illustrating the operation of the electric control circuit.

The handle 14 has a hand grip 56. This is mounted on a longitudinally extending slidable rod 58 housed in a tubing which comprises the main portion of handle 14. There is a spring or the like 60 for normally maintaining the hand grip and the longitudinal rod in retracted position, i.e., to the right in FIG. 1, and this longitudinal rod is connected to and operates a rheostat control 62, see the diagram in FIG. 4, wherein the rheostat is indicated at 64. The control 62 carries current from the battery B through an on and off switch 66 through a line 68 to a pair of transistor elements at 70. These transistor elements multiply the current through the rheostat, which is a low wattage type, to the motor M for control thereof and thus it will be seen that, when the hand grip 56 is grasped in a manner to tend to pull the cart, current will flow to drive the motor and wheel 12. As the operator walks along holding the control grip, the contact slide on the variable rheostat is constantly scanning to match the walking speed of the user so that the cart proceeds at the exact same speed that the user walks. The low wattage rheostat is located in the housing 48, but the circuit insulates the direct battery power from the handle and control means and leads it directly to the motor. The rheostat may also be rotary with a flexible cord to operate it as the rod 58 is pulled.

At full power the rheostat is cut out by means of a contact 72 so when the control 62 closes with contact 72 it is removed physically from the rheostat and directs full battery power to the motor. This represents the top speed of the motor.

Figure 5:
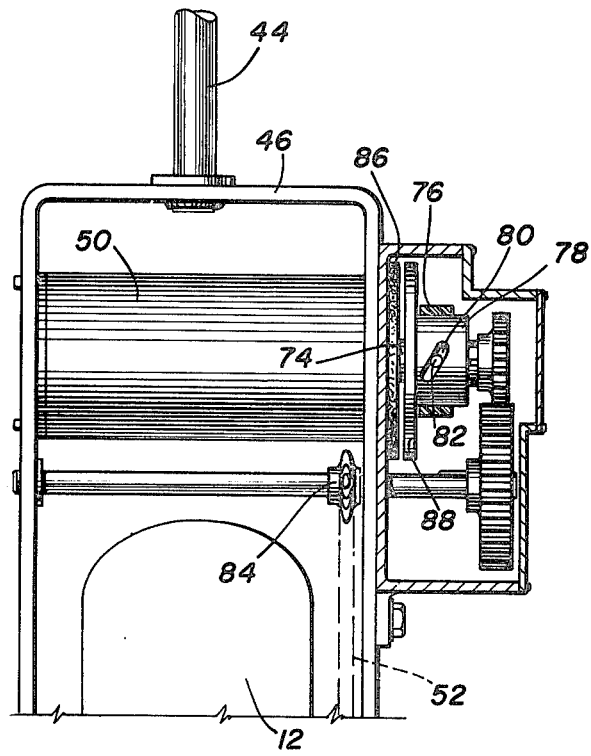
FIG. 5 is a view in front elevation illustrating the motor and front brake.
Figure 6:
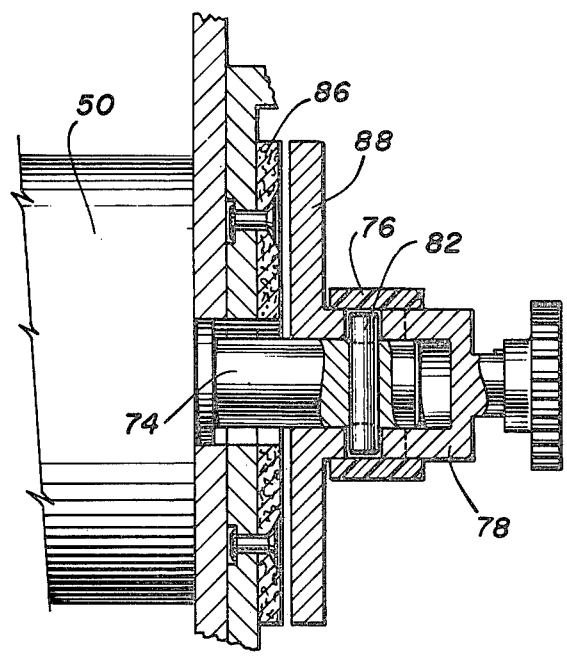
FIG. 6 is a sectional view on an enlarged scale illustrating the front brake.

Referring now to FIGS. 5 and 6, the motor has an extending shaft as at 74. This shaft has a nylon sleeve 76 located about a cylinder 78, the latter having an angle slot therein as at 80 receiving a pin 82 directly through the shaft 74, and by this connection the sprocket 84 is driven, thus driving the chain 52, which in turn drives the forward wheel 12 by any connection desired.

Also on the shaft 74 is a brake material disc 86 and a brake disc 88 and the result of this construction is that the shaft 74 will cause the sprocket 84 to drive only when it is being acted on by the motor M. As soon as the current ceases the brake is closed as when the cart might be attempted to be pulled or roll downhill, the brake is automatically applied, so that when walking downhill it is impossible for the cart to drive the motor shaft and go down the hill without deliberate action by the user to such end, nor can the cart ever exceed the pace of the user.

Figure 7:
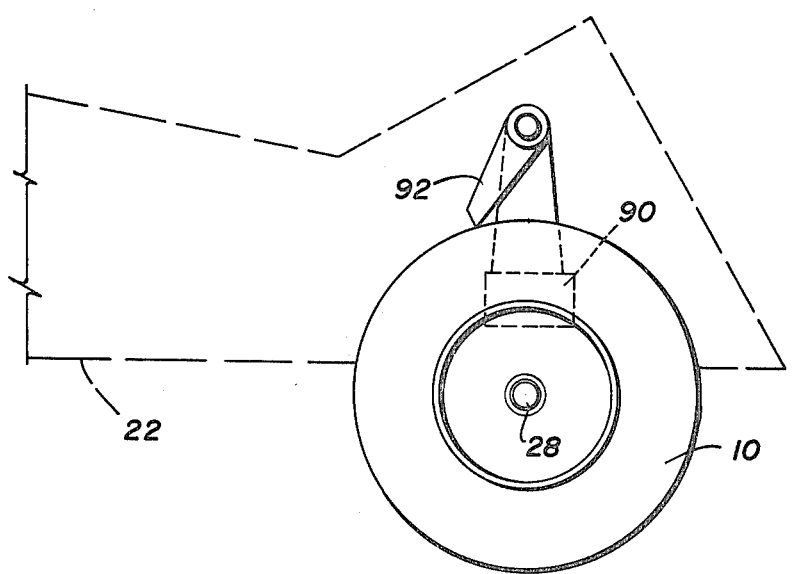
FIG. 7 illustrates the rear pendulum brake.

In addition to this as shown in FIG. 7, the rear member 32 of the frame is provided with a pendulum weight 90 and a pawl 92 which is fixed thereto. Should the cart be on a slope heading downwardly to the rear the pendulum of course maintains its vertical relationship, although the cart maybe on a slant, and this causes the pawl 92 to dig into one of the tires 10 acting as a automatic brake preventing the cart from going downhill to the rear.

The stabilizers referred to above prevent tipping of the cart when on a slope but neither front or back is pointed downhill. As shown in FIG. 1, straps 96 may be used to hold down a load like a golf bag 98 having its bottom as at 100 resting on the slant 26 of the shroud 20, but many other things may be carried, as groceries and other purchases, and seats for children may be mounted on the shroud if desired.

We claim:

1. A power operated cart comprising a frame, a dirigible wheel on the frame, a shaft on the frame spaced from the dirigible wheel, and wheels on the shaft, a battery and motor on the frame, said motor including a drive shaft having a driving connection with said dirigible wheel, an automatic variable tension brake comprising a part of the driving connection, said brake comprising a braking element driven by said dirigible wheel, a braking element driven by the motor, and a cam operated interconnection between said two elements, said cam comprising a cylinder connected to the motor and having an angle slot therein and a radial pin extending through said slot from said drive shaft, the cam urging the elements together and comprising means to apply the brake when the wheel overrides the motor, said cam urging the elements apart to release the brake when the motor overrides the wheel.

* * * * *